United States Patent Office 3,769,235
Patented Oct. 30, 1973

3,769,235
HYDROCRACKING CATALYST COMPRISING A GROUP VIII COMPONENT AND AN AMORPHOUS ALUMINOSILICATE COMPONENT
Robert J. White, Pinole, and Clark J. Egan, Piedmont, Calif., assignors to Chevron Research Company, San Francisco, Calif.
No Drawing. Filed Mar. 31, 1971, Ser. No. 129,986
Int. Cl. B01j 11/40, 11/08
U.S. Cl. 252—455 R
6 Claims

ABSTRACT OF THE DISCLOSURE

Hydrocracking catalyst comprising palladium and an amorphous aluminosilicate component having an alumina content of 40 to 95 weight percent, said catalyst, with the hydrogenating component in the oxide form, having been subjected to a heat treatment in a substantially dry non-reducing gas at a temperature in the range 1200° to 1800° F., and hydrocracking process using said catalyst.

INTRODUCTION

The present invention relates to an improved hydrocarbon conversion catalyst, and to an improved hydrocarbon conversion process using said catalyst. More particularly, the present invention covers a catalyst comprising palladium and an amorphous aluminosilicate component, and to an improved hydrocarbon conversion process using said catalyst. In one embodiment, the present invention is directed to a hydrocracking catalyst comprising palladium and an amorphous aluminosilicate component. The catalyst of the present invention is useful in various hydrocarbon conversion processes, including hydrogenation, dehydrogenation, alkylation and reforming processes; however, its preferred application is as a catalyst in a hydrocracking process, particularly a hydrocracking process being operated with jet fuel production as a primary objective. It is known that hydrocracking processes using catalysts comprising noble metal components associated with amorphous aluminosilicate components have been used to produce jet fuel. However, there has been a strong continuing need for improvement not only of the jet fuel yield in such processes, but also of the total $C_5+$ liquid yield, with concomitant minimization of the production of $C_4-$ light hydrocarbon gases. There also has been a continuing need in such processes for improvements directed to increasing catalyst activity, which is needed to reduce catalyst operating temperatures and aid in prolonging catalyst life.

STATEMENT OF INVENTION

In accordance with the present invention, there is provided a hydrocarbon conversion catalyst, preferably intended for use as a hydrocracking catalyst, comprising palladium in the metal, oxide or sulfide form, and an amorphous aluminosilicate component having an alumina content of 40 to 95 weight percent, preferably above 60 weight percent, more preferably between 60 and 95 weight percent, with good results being obtainable with alumina contents between 65 and 85 weight percent, said catalyst having an activity as induced therein by having been subjected, with the hydrogenating component in the oxide form, to a heat treatment in a substantially dry non-reducing gas, for example air, at a temperature in the range 1200° to 1800° F. Said gas will be considered substantially dry if it contains less than 1 weight percent water. Preferably it will contain less than 0.1 weight percent water, and more preferably less than 0.01 weight percent water.

It is desirable that the catalysts of the present invention have a surface area of at least 100 square meters per gram and a bulk density such that the product of the numerical values of surface area and bulk density is in the range of 100 to 450, preferably 200 to 300 square meters/millilitre.

Further in accordance with the present invention, there is provided a hydrocracking process which comprises hydrocracking a hydrocarbon feedstock in a reaction zone at conventional hydrocracking conditions in the presence of hydrogen and a catalyst comprising palladium and an amorphous aluminosilicate component having an alumina content of 40 to 95 weight percent, the numerical product of the surface area and bulk density of said catalyst being in the range of 100 to 450, and recovering from said reaction zone a 300–550° F. jet fuel product in a yield greater than 50 volume percent, based on said feedstock, with an accompanying production of $C_4-$ light gases of less than 8 volume percent, based on said feedstock. Further, said catalyst used in said process preferably is a catalyst which has been subjected, with the hydrogenating component in the oxide form, to a heat treatment in a substantially dry non-reducing gas, for example air, at a temperature in the range of 1200° to 1800° F. Said heat treatment conveniently is accomplished in a flowing stream of heated air.

CATALYST CONSTITUENTS AND PROPORTIONS THEREOF

The hydrocarbon conversion catalyst of the present invention contains no amorphous aluminosilicate component having an alumina content of 40 to 95 weight percent, preferably 50 to 80 weight percent. That is, the alumina/silica weight ratio is 40/60 to 95/5, preferably 50/50 to 80/20. Said aluminosilicate component can be prepared by conventional methods, for example by cogelation.

The hydrogenating component of the subject invention is palladium. The hydrogenating component will be present in the catalyst in an amount of 0.02 to 10 weight percent, preferably 0.1 to 1 weight percent, and more preferably 0.1 to 0.5 weight percent, calculated as metal.

The heat treatment at 1200° to 1800° F. is accomplished with the hydrogenating component of the catalyst in the oxide form, with a substantially dry non-reducing gas under non-reducing conditions. During hydrocracking process use the hydrogenating component will tend to become reduced under the conditions prevailing in the hydrocracking reaction zone.

CATALYST PHYSICAL CHARACTERISTICS

The catalyst of the present invention will have a surface area of at least 100 square meters per gram, and a bulk density such that the numerical product of the surface area and the bulk density is in the range of 100 to 450, preferably 200 to 300.

CATALYST PREPARATION

The amorphous aluminosilicate component of the catalyst of the present invention may be prepared by any conventional method, for example cogelation. The aluminosilicate component after formation thereof may be dried and subjected to a heat treatment, for example at 800° F., prior to impregnation of the aluminosilicate component with a precursor of the hydrogenating component. The hydrogenating component may also be added to the cogel before drying.

Following preparation of the aluminosilicate component, that component may be impregnated with any suitable precursor of the hydrogenating component, and the resulting composite may be dried, all in a conventional manner. Prior to use in a hydrocarbon conversion process, however, the catalyst composite so prepared is subjected, with the hydrogenating component thereof in the oxide form, to a heat treatment in a substantially dry non-reducing gas at a temperature in the range 1200° to 1800° F., preferably 1450° to 1700° F., for a period which may range from 0.25 to 48 hours, preferably 0.5 to 10 hours, and more preferably 1 to 5 horus. Particularly good results have been obtained with heat treatments of 1 to 4 hours at 1600° F. The necessary oxide form of the hydrogenating component may be attained during said heat treatment, as the result of the presence of oxygen in said non-reducing gas, or may be the result of a previous heat treatment step such as calcination in air at a temperature of at least 450° F.

Said heat treatment in a substantially dry non-reducing gas preferably is carried out in a stream of substantially dry air at the indicated temperature.

CATALYST SULFIDING

During the hydrocarbon conversion reaction, palladium in the metal or oxide forms does not tend to become sulfided from any sulfur compounds that might be present in the feed. This becomes important, because sulfiding of the hydrogenating component tends to lower the yield of jet fuel obtained.

HYDROCARBON FEEDSTOCKS

The catalyst of the present invention is effective in converting a wide range of hydrocarbon feedstocks, including petroleum distillates, petroleum residua, and various cycle stocks. Preferably the hydrocarbon feedstocks will boil in a range of 400° to 950° F., preferably 500° to 950° F.

The nitrogen content of the hydrocarbon feedstocks should be below 0.05 wt. percent, preferably below 0.02 wt. percent, and more preferably below 10 p.p.m. The sulfur content of the feedstocks also should be below 0.05 wt. percent, preferably below 0.02 wt. percent, and more preferably below 10 p.p.m. If desired, the hydrocarbon feedstocks may be subjected to a conventional hydrofining pretreatment step prior to being converted in the presence of the catalyst of the present invention.

HYDROCARBON CONVERSION PROCESSES AND REACTION CONDITIONS

The catalyst of the present invention is useful in many hydrocarbon conversion processes, including hydrogenation, dehydrogenation, alkylation and reforming processes, but it is especially useful when used in a hdyrocracking process.

Hydrocracking process conditions may be conventional conditions, for example a temperature in the range 450° to 850° F., a pressure in the range 500 to 3500 p.s.i.g., a space velocity in the range 0.5 to 3.0, and a total hydrogen rate of 1000 to 20,000 s.c.f., preferably 1000 to 5000 s.c.f., of hydrogen per barrel of feedstock.

When the catalyst is contacted with the hydrogen used in a hydrocracking reaction, some reduction to metal of any hydrogenating component oxides that are present will take place. This is not detrimental, so long as the hydrogen does not contact the catalyst at a temperature appreciably higher than reaction temperature at the start of the run.

EXAMPLES

Example 1

1400 grams of $AlCl_3 \cdot 6H_2O$ were dissolved in 5 litres of $H_2O$ to form a first solution. 300 grams of sodium silicate were dissolved in 4 litres of water to form a second solution. Said first and second solutions were combined to form a mixture, the pH of which was adjusted to 7 by the addition of 3 litres of a solution of 2 parts $H_2O$ and 1 part $NH_4OH$. The resulting mixture, in the form of a suspension, was heated to 150° F., the pH was readjusted to 7, and the mixture was filtered to produce a cogel paste filter cake. The filter cake was washed 4 times in 13 litres of 1% ammonium acetate solution at 150° F., and once in 13 litres of $H_2O$ at 150° F. The resulting alumina-silica cogel paste had the following characteristics:

| | |
|---|---|
| Weight in grams | 5905 |
| Total solids content, wt. percent | 6.75 |
| Pore volume of solids, ml./gm. | 0.8 |
| $Al_2O_3/SiO_2$ weight ratio | 72/28 |

To 2660 grams of the aforesaid alumina-siilca paste were added 4.61 grams of palladium tetra ammino dinitrate dissolved in 83 ml. of $H_2O$. The resulting mixture was blended in a kitchen mixer, together with an additional 450 ml. of $H_2O$, for several hours. The resulting product was dried, broken into pieces, and calcined in substantially dry air for 4 hours at 450° F., 8 hours at 1000° F. and about 4 hours at 1600° F. The resulting catalyst was ground up, producing approximately 93 grams in a 10–16 mesh size range, and approximately 93 grams in a size range below 16 mesh. The 10–16 mesh size material, having a surface area of 300 m.$^2$/g., was again calcined in substantially dry air for 1 hour at 1600° F. The resulting catalyst had the following characteristics:

| | |
|---|---|
| Pore volume, cc./g. | 0.546 |
| Bulk density, g./ml. | 0.61 |
| Palladium content, wt. percent | 0.84 |
| Average pore diameter, angstroms | 73 |

Example 2

1130 grams of $AlCl_3 \cdot 6H_2O$ were dissolved in 5 litres of $H_2O$, and 125 ml. glacial acetic acid was added, to form a first solution. 540 grams of sodium silicate were dissolved in 2.5 litres of water to form a second solution. Said first and second solutions were combined to form a mixture, the pH of which was adjusted to 7 by the addition of 3 litres of a solution of 2 parts $H_2O$ and 1 part $NH_4OH$. The resulting mixture, in the form of a suspension, was heated to 150° F., the pH was readjusted to 7, and the mixture was filtered to produce a cogel paste filter cake having a solids content of 8.06 wt. percent. The filter cake was washed 4 times in 14 litres of 1% ammonium acetate at 150° F., once in 14 litres of $H_2O$ at 150° F., and was oven dried overnight at about 250° F. The resulting dried material had these characteristics:

| | |
|---|---|
| Total solids content, wt. percent | 71.3 |
| Pore volume of solids, cc./g. | 0.195 |
| $Al_2O_3/SiO_2$ weight ratio | 60/40 |

To 484 grams of the aforesaid dried alumina-silica material were added 8.869 grams of palladium tetra amino dinitrate dissolved in 95 ml. $H_2O$. The resulting mixture was mixed until evenly wetted and then was dried in an oven overnight at 250° F. The dried mixture was separated into three catalyst portions: (1) above 200 cc. in 10–24 mesh size; (2) 84 cc. in 24–60 mesh size; and (3) all remaining material (about 220 cc.) of smaller than 24 mesh. These three catalyst portions were calcined in substantially dry air as follows:

| Portion | Temp., °F. | Time, hours | Resulting bulk density, g./cc. |
|---|---|---|---|
| (1) | 450 / 1,000 / 1,600 | 16 / 8 / 4 | 0.96 |
| (2) | 450 / 1,000 / 1,600 | 4 / 8 / 4 | 0.93 |
| (3) | 450 / 1,000 / 1,600 | 5 / 8 / 4 | 0.89 |

NOTES:
Catalyst portion (2) was analyzed and found to have the following additional characteristics:

| | |
|---|---|
| Surface area, m.²/g. | 266 |
| Palladium content, wt. percent | 0.88 |
| Particle density, g./cc. | 1.61 |
| Pore volume, cc./g. | 0.23 |
| Average pore diameter, angstroms | 35 |
| Silica content, wt. percent | 41 |
| Alumina/silica weight ratio | 60/40 |

Catalyst portions (1) and (3) had similar characteristics.

Example 3

The 10–16 mesh size catalyst of Example 1 was used to hydrocrack a hydrocarbon feedstock consisting of a denitrified mixture of about 2 parts by volume of a California straight run gas oil and 1 part by volume of an FCC cycle oil. The hydrocarbon feedstock had the following characteristics:

ASTM D–1160 boiling range, °F.:
| | |
|---|---|
| Start | 553 |
| 5% | 589 |
| 10% | 595 |
| 30% | 617 |
| 50% | 646 |
| 70% | 684 |
| 90% | 732 |
| 95% | 763 |
| End | 859 |

Other characteristics:
| | |
|---|---|
| Gravity, °API | 39.9 |
| Aniline point, °F. | 192.7 |
| Sulfur, p.p.m. | 1–2 |
| Nitrogen, p.p.m. | 0.1 |
| Pour point, °F. | +55 |
| Paraffins plus naphthenes, vol. percent | 90 |
| Aromatics, vol. percent | 10 |

The above-described feedstock was hydrocracked in a recycle run under these conditions:

| | |
|---|---|
| Total pressure, p.s.i.g. | 1200 |
| Liquid hourly space velocity, v./v./hr | 1.50 |
| Conversion, liquid vol. percent to 550° F. | 60 |
| Recycle gas rate, s.c.f./bbl. of feed | 5600 |
| Boiling range of liquid product recycled, °F. | 550+ |
| Hydrogen consumption, s.c.f./bbl. of feed | 1000 |

The results of said recycle run were as follows:

| | |
|---|---|
| Starting temperature, °F. | 617 |
| Yield of $C_5+$ liquid product, vol. percent | 108 |
| Yield of 300°–550° F. jet fuel, vol. percent | 69 |

Example 4

Catalyst portion (1) of Example 2 was used to hydrocrack another portion of the same feedstock used in Example 3. The feedstock was hydrocracked in a recycle run under these conditions:

| | |
|---|---|
| Total pressure, p.s.i.g. | 1200 |
| Liquid hourly space velocity, v./v./hr. | 1.5 |
| Conversion, liquid vol. percent to 550° F. | 60 |
| Recycle gas rate, s.c.f./bbl. of feed | 5600 |
| Boiling range of liquid product recycled, °F. | 550+ |
| Hydrogen consumption, s.c.f./bbl. of feed | 1000 |

The results of said recycle run were as follows:

| | |
|---|---|
| Starting temperature, °F. | 565 |
| Yield of $C_5+$ liquid product, vol. percent | 107 |
| Yield of 300°–550° F. jet fuel, vol. percent | 63 |
| Fouling rate at end of 300 hours operation, °F./hr. | 0.02 |

Example 5

This is an example of a run using a lower palladium content catalyst prepared by impregnation of a cogel before calcining.

500 grams of s cogel was prepared by cogelation at a pH of 6.5 (similar to Example 2), drying at 95° F. to a solids content of 30%, washing with ammonium acetate (similar to Example 2). The washed cogel was contacted with a solution containing 0.83 gram palladium tetra ammino dinitrate in 714 ml. of $H_2O$ for 50 minutes. The solution was removed and the cogel was dried for 4 hours at 140° F. The cogel, in 10–16 mesh form, was dried and calcined in substantially dry air for 4 hours at 450° F., 8 hours at 1000° F. and 4 hours at 1600° F.

The catalyst had the following characteristics:

| | |
|---|---|
| Surface area, m.²/g. | 327 |
| Palladium content, wt. percent | 0.22 |
| Pore volume, cc./g. | 0.36 |
| Average pore diameter, angstroms | 44 |
| Alumina/silica weight ratio | 60/40 |
| Bulk density, g./cc. | 0.91 |

This catalyst was used to hydrocrack another portion of the feedstock used in Example 3. The feedstock was hydrocracked in a recycle run under these conditions:

| | |
|---|---|
| Total pressure, p.s.i.g | 1200 |
| Liquid hourly space velocity, v./v./hr. | 3 |
| Conversion, liquid volume percent of 550° F. | 60 |
| Recycle gas rate, S.C.F./bbl. of feed | 5600 |
| Boiling range of liquid product recycled, °F. | 550+ |
| Hydrogen consumption, S.C.F./bbl. of feed | 1000 |

The results of said recycle run were as follows:

| | |
|---|---|
| Starting temperature, °F. | 603 |
| Yield of $C_5+$ liquid product, vol. percent | 107 |
| Yield of 300–500° F. jet fuel, vol. percent | 62 |
| Fouling rate at 300 hours, °F./hr. | 0.05 |

Examples 6 and 7

The following examples of two catalysts that were prepared and tested show the beneficial effect of calcining in substantially dry air at a temperature higher than 1200° F.

EFFECT OF TEMPERATURE OF HEAT TREATMENT IN SUBSTANTIALLY DRY AIR ON CATALYST ACTIVITY AND JET YIELD

| | Ex. 6 | Ex. 7 |
|---|---|---|
| Alumina/silica ratio | 60/40 | 60/40 |
| Hydrogenation component | (¹) | (¹) |
| Calcination temperature, °F. | 1,600 | 1,000 |
| Starting temperature, °F. | 580 | 620 |
| Conversion to 550° F.—, percent | 62 | 62 |
| Calculated ultimate 300–550° F. jet yield, wt. percent | 67 | 63 |
| Calculated ultimate $C_4-$ product, wt. percent | 3.6 | 5.6 |

¹ 1% Pd.

Examples 8 and 9

The following examples of two catalysts that were prepared and tested show the effect of alumina/silica ratio on catalyst activity, each catalyst having been calcined at the indicated temperature in substantially dry air.

| | Ex. 8 | Ex. 9 |
|---|---|---|
| Alumina/silica ratio | 72/28 | 60/40 |
| Starting temperature, °F. | 616 | 590 |
| Hydrogenation component | (¹) | (¹) |
| Calcination temperature, °F. | 1,600 | 1,600 |
| Conversion to 550° F.—, percent | 51 | 53 |
| Calculated ultimate 300–550° F. jet yield, wt. percent | 69.5 | 70.5 |
| Calculated ultimate $C_4-$ product, wt. percent | 3.5 | 3.5 |

¹ 1% Pd.

These examples show that a larger catalyst temperature span during a run can be obtained by using the more active, 60/40 alumina/silica catalyst.

Example 10

This example shows the typical low yields from a conventional catalyst having an alumina content below 40%. A noble metal (0.5% palladium) on fluorided silica-alumina catalyst (containing 0.5% chromium), having an alumina/silica ratio of 35/65, was used to hydrocrack the feedstock described in Example 3. This catalyst had similar activity and stability, but gave a lower jet fuel yield of 54 vol. percent, and the production of $C_4-$ light gases was greater than 10.5 vol. percent.

Example 11

This example shows the low jet yeld from a conventional catalyst having an alumina content of 28.5%. A nickel sulfide-on-silica-alumina catalyst having an alumina/silica ratio of 35/65, was used to hydrocrack the feedstock in Example 3. This catalyst had similar activity and stability, but gave a lower jet fuel yield of 47.5 vol. percent, and the production of $C_4-$ light gases was greater than 12.5 vol. percent.

SUMMARIES, THEORIES AND CONCLUSIONS

Although applicants do not intend to be bound by any theories they may advance for the unexpectedly improved performance of the catalyst of the present invention, such theories will be set forth here as a possible aid in understanding the present invention.

In the present invention the entire catalyst composite, with the hydrogenating component in the oxide form, has been subjected to a heat treatment in a substantially dry non-reducing gas at a temperature in the range 1200° to 1800° F., rather than the amorphorus aluminosilicate component alone having been subjected to such a heat treatment. Some similar advantages may be obtainable from such a heat treatment of the amorphous aluminosilicate component alone, prior to impregnation with one or more hydrogenating components; however, after such a heat treatment the amorphus aluminosilicate component would be extremely hygroscopic. Therefore, as a practical matter, an aqueous impregnation technique could not be used. A non-aqueous impregnation technique might be feasible; however, it still would be necessary to keep the heat-treated amorphous aluminosilicate component in a very dry atmosphere at all times following the heat treatment step, and the necessity for such a dry atmosphere would complicate the carrying out even of a non-aqueous impregnation technique.

It is believed that while the catalyst of the present invention is being subjected to the non-reducing heat treatment at a temperature in the range 1200° to 1800° F., the activity of the catalyst is increased without lowering the ratio hydrogenation activity to acidity. It is believed that the high ratio of hydrogenation activity to acidity accounts for the production of high jet fuel yields and high $C_5+$ liquid yields in a hydrocracking process.

Applicants have found that there is a critical combination of the level of activation temperature, the alumina/silica ratio, the kind of metal contained in the hydrogenating component, the oxidation state of the hydrogenating component during activation, the non-reducing nature of the gas used during activation, and the dryness of the gas used during activation. They have found that if the alumina content of the aluminosilicate component of the catalyst is at least 40 weight percent, and preferably at least 50 weight percent, the total catalyst component will be sufficiently resistant to high-temperature deterioration of surface areas that the catalyst can withstand a non-reducing heat treatment at a temperature in the range 1200° to 1800° F. Applicants further have found that when such high-temperature non-reducing heat treatment is used in conjunction with the other elements and factors of the critical combination discussed above, the very surprising, unpredictable and unobvious improved results discussed herein are obtained. It is only with the catalyst of the present invention that it has been possible to obtain such high $C_5+$ liquid yields, such high jet yields, such as low production of $C_4-$ light gases, and reasonable conversions at such low operating temperatures.

What is claimed is:

1. A hydrocarbon conversion catalyst comprising a hydrogenating component selected from the group consisting of palladium, palladium sulfide, and palladium oxide in an amount of 0.1 to 10.0 weight percent, calculated as metal, and an amorphous aluminosilicate component having an alumina content of 40 to 95 weight percent, said catalyst having an activity as induced therein by having been subjected, with the hydrogenating component in the oxide form, to a heat treatment in a substantially dry non-reducing gas at a temperature in the range 1200° to 1800° F.

2. A catalyst as in claim 1, wherein said heat treatment is accomplished in air at a temperature in the range 1450° to 1700° F.

3. A catalyst as in claim 1, having a surface area and bulk density such that the product of the numerical values of each is in the range 100 to 450.

4. A catalyst as in claim 1, wherein said amorphorus alumino-silicate component is a cogel and wherein said hydrogenating component was added to said cogel material when said cogel material was in a washed and partially dried form.

5. A catalyst as in claim 1, wherein said hydrogenating component is present in an amount of 0.1 to 0.5 weight percent, calculated as metal.

6. A catalyst as in claim 1, wherein said amorphous aluminosilicate component has an alumina content of 50 to 80 weight percent.

References Cited

UNITED STATES PATENTS 3,243,368　3/1966　Mulaskey ＿＿＿＿＿＿＿＿ 208—111
3,453,204　7/1969　Mulaskey ＿＿＿＿＿＿＿＿ 208—111

CARL F. DEES, Primary Examiner

U.S. Cl. X.R.
252—460; 208—111